United States Patent Office 3,194,797
Patented July 13, 1965

3,194,797
HYDRAZO GROUP CONTAINING POLYMERS
John R. Caldwell and Edward H. Hill, Kingsport, Tenn., assignors to Eastman Kodak Company, Rochester, N.Y., a corporation of New Jersey
No Drawing. Filed Nov. 2, 1959, Ser. No. 850,036
12 Claims. (Cl. 260—85.5)

This invention relates to modified addition polymers having improved dyeability, and more particularly to dyeable polymeric materials which are the reaction products of certain copolymers that contain halogen groups, for example a —$CH_2Cl$ or —$CH_2Br$ group, with a select group of organic nitrogen bases containing hydrazo groups of the structure $$R_3NH—N<$$

wherein $R_3$ is as defined hereinafter.

The new class of dyeable polymeric materials of the invention are reaction products of (1) copolymers of from 4–35%, but preferably from 10–25%, by weight of a halogen containing compound represented by the following general formula:

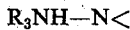

wherein $R_1$ is hydrogen or a methyl group, $R_2$ is a divalent straight or branched chain, alkylene, oxyalkylene or alkylenecarboxy group containing from 1–4 carbon atoms, e.g., —$CH_2$—, —$CH_2CH_2$—, —$CH(CH_3)CH_2$—, —$OCH_2$—, —$OCH_2CH_2$—, —$(CH_2)_4$—, —$OCOCH_2$—, —$OCOCH_2CH_2$—, etc., groups and X represents chlorine or bromine, and conversely from 96 to 65%, but preferably from 90 to 75%, by weight of one or more different monoethylenically unsaturated, polymerizable compounds represented by the symbol R and containing a —$CH=C<$ group, but more especially containing a $CH_2=C<$ group, with (2) a hydrazo compound represented by the general formula:

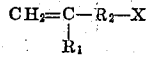

wherein $R_3$ is hydrogen, a straight or branched chain alkyl group of from 1–8 carbon atoms or a cycloalkyl group, e.g., methyl, ethyl, propyl, isopropyl, butyl, isobutyl, sec. butyl, tert. butyl, neopentyl, hexyl, octyl, cyclohexyl, etc., groups, $R_4$ is hydrogen, a straight or branched chain alkyl group of from 1–8 carbon atoms as above defined, a cyclohexyl group or a hydroxyalkyl group of from 2–4 carbon atoms, e.g., β-hydroxyethyl, γ-hydroxypropyl, etc., groups, and $R_5$ is hydrogen, a straight or branched chain alkyl group of from 1–8 carbon atoms as above defined, an acyl group containing from 2–8 carbon atoms, e.g., acetyl, propionyl, butyryl, benzoyl, etc. groups or a hydroxyacyl group, i.e., the acyl radical of a monohydroxy carboxylic acid such as lactic, glycol, salicylic, etc. acids, and wherein $R_4$ and $R_5$ together represent the groups that are necessary to complete a triazole nucleus which may be further substituted on the nuclear carbon atoms with alkyl groups of from 1–8 carbon atoms such as above defined or phenyl, tolyl, etc., groups.

Accordingly, the above defined hydrazo group containing copolymers of the invention comprises in the polymer molecule randomly recurring units of the formulae (I) —R—

(II) 

and (III) 

wherein R, $R_1$, $R_2$, $R_3$, $R_4$, $R_5$ and X are as defined above. The hydrazo group-containing polymers contain in the polymer molecule at least about 65% by weight of (I) units and the total of the (II) units and the derived hydrazo units (III) at least about 4% by weight. Copolymers containing less than 4% by weight of units (II) and (III) do not dye satisfactorily, while those containing above 35% by weight have good affinity for dyes but show less satisfactory physical properties for fiber-making purposes. In addition to improved dyeing properties, many of the above defined copolymers of the invention are also valuable for certain color photographic processes.

It is, accordingly, an object of the invention to provide a new class of polymers of improved dyeability. Another object is to provide shaped articles such as fibers, thin sheets, etc. from halogen-containing polymers, which articles on treatment with certain hydrazo compounds of the invention have greatly increased affinity for acid wool dyes, direct cotton dyes, cellulose acetate dyes, vat dyes and premetallized dyes. Another object is to provide a process for preparing the above polymers and shaped articles of improved dyeability.

Other objects will become apparent hereinafter.

In accordance with the invention, we prepare our novel dyeable copolymer compositions by treating the initial copolymers containing halogen groups or shaped articles therefrom with the mentioned hydrazo compounds. The reaction between the halogen and the hydrazo compound takes place under very mild conditions and is highly selective. The reaction can be carried out in the presence of nitrile or ester groups and in the presence of other halogen groups not attached to a primary carbon atom. For example, the finely divided initial copolymer may be stirred with preferably an excess of the hydrazo compound, i.e., an amount greater than calculated to completely replace all of the available halogen, and then washed for example with water. Advantageously, solutions of the initial copolymer in solvents such as dioxane, dimethylformamide, sulfolane or dimethylacetamide may be mixed with the hydrazo compound. Also, fibers or films of the copolymer may be treated with a solution of the hydrazo compound or exposed to the vapor. In any event, the copolymer will still contain some residual unreacted halogen-containing groups. While the reaction with the hydrazo compound can be carried out over a relatively wide range, preferably a temperature of from about 20°–100° C. is employed. The time of treatment or reaction is not critical since good dyeability is obtained in some cases in as little as 10 minutes, although periods up to several hours or more depending on the initial copolymer, temperature, concentration of the dye, etc. may advantageously be used. The copolymers of acrylonitrile/allyl chloride modified by treatment with N,N-dimethylhydrazine are preferred.

Suitable hydrazo compounds for practicing our invention include hydrazine and substituted hydrazines such as methylhydrazine, 2-hydroxyethylhydrazine, N,N-dimethylhydrazine, N,N'-dibutylhydrazine, phenylhydrazine, cyclohexylhydrazine, etc., hydrazides such as acetic acid hydrazide, benzoic acid hydrazide, salicylic acid hydrazide, N-methyl acetic acid hydrazide, N,N-dimethyl acetic acid hydrazide, N-methyl benzoic acid hydrazide, etc. and amino triazoles having the general formula

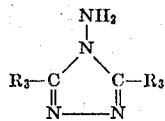

wherein $R_3$ is as above defined, for example, 4-amino-1,2,4-triazole, 4-amino-3,5-dimethyl-1,2,4-triazole, etc.

Suitable halogen-containing monomers of the formula

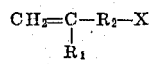

wherein $R_1$, $R_2$ and X are as previously defined, for preparing the initial copolymers of the invention include allyl chloride or bromide, methallyl chloride or bromide, chloroethyl vinyl ether, allyl chloroacetate, methallyl chloroacetate, vinyl chloroacetate, allyl bromoacetate, 4-chlorobutene-1, etc. Suitable monoethylenically unsaturated, polymerizable compounds represented by R for copolymerizing with the above halogen-containing monomers include vinyl esters of saturated monobasic acids containing from 2–8 carbon atoms such as vinyl acetate, vinyl propionate, vinyl butyrate, vinyl benzoate, the vinyl methylbenzoates, etc., vinyl alkyl ethers such as vinyl methyl ether, vinyl ethyl ether, etc., isopropenyl esters such as isopropenyl acetate, isopropenyl butyrate, isopropenyl benzoate etc., vinyl alkyl ketones such as vinyl methyl ketone, vinyl propyl ketone, etc., acrylic, methacrylic, maleic, fumaric, itaconic and citraconic acids and their alkyl esters, nitriles, anhydrides, amides and N-alkyl and N,N-dialkyl substituted amides etc., vinyl sulfonamides e.g. vinyl sulfonamide, N-methyl vinyl sulfonamide, etc., N-vinyl imides e.g. vinyl succinimide, vinyl phthalimide, etc., N-vinyl lactams, vinyl pyridines, vinyl alkyl sulfones, and vinylidene halides such as bromide or fluoride, vinyl chloride, vinylidene chloride, vinylidene cyanide, etc., vinyl urethanes such as vinyl methyl urethane, vinyl ethyl urethane, etc., ethylene, isobutylene, butadiene, isoprene, 2-chlorobutadiene, 2,3-dimethylbutadiene, and the like.

The polymerizations for preparing the initial copolymers of the invention are carried out by the standard emulsion, bead or bulk processes, using the commonly known polymerization catalysts, e.g., peroxides such as benzoyl peroxides, acetyl peroxide, tertiary butyl hydroperoxide, hydrogen peroxide, etc., persulfates such as sodium or potassium persulfate, ammonium persulfate, persulfuric acid, etc., perborates such as sodium or potassium perborates, etc., the water-soluble salts of perphosphoric acid, axo-bis-isobutyronitrile and the like. The amount of catalyst can vary from about 0.2 to 3.0%, based on the weight of the monomers. Where the emulsion technique is employed, advantageously an emulsifying or dispersing agent is added to the polymerization mixtures in an amount not exceeding about 3.0% of the weight of the monomers. Suitable emulsifying agents include salts of higher fatty acids e.g. sodium or potassium stearate, palmitate, etc., ordinary soaps, salts of higher fatty alcohol sulfates such as sodium or potassium cetyl sulfate, sodium or potassium lauryl sulfate, etc., or dispersing agents such as starch, methylated starch, gum arabic, polyvinyl alcohol, and the like. A chain regulator such as an alkyl mercaptan, e.g., hexyl, octyl, lauryl, dodecyl mercaptans, can also be added with advantageous results to the polymerization mixtures. Stirring, shaking or tumbling of the polymerization mixture during the reaction gives improved product and yield. The polymerizations may be carried out over a wide range, but preferably in the range of about from 30°–100° C.

The following examples will serve further to illustrate our new dyeable copolymers and the manner of their preparation.

*Example 1*

Twenty grams of acrylonitrile and five grams of 2-chloroethyl vinyl ether were placed in a bottle and the following materials added:

0.25 g. potassium persulfate
0.25 g. sodium bisulfite
0.5 g. sodium octadecyl sulfate
200 cc. water The bottle was tumbled in a water bath at 55–60° C. for 24 hours. The product was precipitated by adding sodium sulfate, washed, and dried. It weighted 22 g. and was soluble in dioxane, dimethylformamide, dimethylsulfolane, and acetonitrile. Analysis showed it contained 14.5% of the vinyl ether.

One hundred parts of the polymer prepared as above was dissolved in 500 parts of dimethylformamide and 10 parts of phenyl hydrazine was added. The solution was stirred at 50° C. for 1 hour and then spun into fibers. The fibers dyed heavily with acid wool dyes, direct cotton dyes, and vat dyes. In contrast, fibers prepared from the polymer but without phenyl hydrazine treatment dyed very poorly with the same dyes.

*Example 2*

Fourteen grams of methyl acrylate, four grams of allyl chloride, and two grams of divinyl benzene were placed in a flask and the following materials added:

0.20 g. potassium persulfate
0.20 g. sodium bisulfite
0.4 g. sodium lauryl sulfate
150 cc. water The emulsion was stirred rapidly at 55–60° C. for 8 hours. The product was a highly cross-linked polymer in a water suspension. Fifteen parts of hydrazine was added to 100 parts of polymer in suspension and the mixture stirred at 40° C. for 2 hours. It was then acidified with acetic acid, 3 parts of an acid wool dye added, and the temperature raised to 90–100° C. for 1 hour. The product was isolated by evaporating the water. The deeply dyed pigment could be suspended in colloidal form in acetone, dimethylformamide, alcohols, and glycols.

*Example 3*

Using the general method described in Example 1, an interpolymer was made that contained 88% acrylonitrile and 12% 4-chlorobutene-1. One hundred parts of the polymer was dissolved in 500 parts of dimethylformamide and 15 parts of salicylic acid hydrazide was added. The solution was stirred at 40–50° C. for 2 hours and then extruded through a spinneret into a precipitating bath consisting of 60 parts water-40 parts dimethylformamide. The fibers were washed, dried, and drafted 200–300% in a heated chamber.

Treatment of the fibers in an aqueous solution of a diazo salt gave a dye that was chemically combined with the polymer.

*Example 4*

An interpolymer was made having the composition by weight of 85% acrylonitrile-5% ethyl acrylate-10% methallyl bromide. Fibers were made by dry spinning a solution of the polymer in dimethyl acetamide. The fibers were soaked for 3 hours at 80° in a 10% water solution of 4-amino-3,5-dimethyl-1,2,4-triazole. They were then rinsed and dried. They dyed heavily with acid wool dyes, direct cotton dyes, cellulose acetate dyes, vat dyes, and premetallized dyes. In contrast, fibers prepared from the polymer without the triazole treatment had little or no affinity for the same dyes.

*Example 5*

An interpolymer was made having the composition by weight of 92% acrylonitrile-8% allyl chloroacetate. One hundred parts was dissolved in 500 parts of dimethylformamide and 10 parts of dimethyl hydrazine was added. The solution was stirred at 30–40° C. for 1 hour. Fibers spun from the product dyed well with cellulose acetate dyes, acid wool dyes, and direct cotton dyes.

*Example 6*

An interpolymer having the composition by weight of 80% acrylonitrile-20% methallyl chloride was prepared as an aqueous emulsion and was isolated as a fine powder. One hundred parts of the polymer was stirred 4 hours at 80° C. with a solution 25 parts of acetic acid hydrazide in 300 parts isopropyl alcohol. The polymer was then filtered, washed, with isopropyl alcohol, and dried. Fibers spun from the treated polymer dyed heavily with cellulose acetate dyes, acid wool dyes, direct cotton dyes, and vat dyes.

*Example 7*

An interpolymer of 80% methyl methacrylate-20% chloroethyl vinyl ether by weight was dissolved in dioxane and 25% of 4-amino-1,2,4-triazole was added to the solution, based on the weight of the polymer. The solution was stirred at 40–45° C. for 1 hour and the polymer isolated by precipitating in water and washing. Films cast from the polymer dyed heavily with acid wool dyes.

*Example 8*

An interpolymer of 95% ethylene-5% chloroethyl vinyl ether by weight was extruded as a film 2 mils thick. The film was soaked for 4 hours in a 15% benzene solution of butyl hydrazine. The film could be dyed or printed with wool dyes and cellulose acetate dyes.

*Example 9*

Fibers were spun from a polymer having the composition by weight of 60% vinyl chloride-30% acrylonitrile-10% allyl bromide. They were soaked in a 10% aqueous solution of hydrazine for 30 minutes at room temperature and dried. They dyed well with acid wool dyes, direct cotton dyes, and premetallized dyes.

*Example 10*

An interpolymer of 85% styrene-15% allyl chloroacetate by weight was dissolved in dioxane and 15% of benzoic acid hydrazide was added to it. The solution was stirred at 50–55° C. for 2 hours and then isolated by pouring into water. Fibers spun from the polymer dyed heavily with acid wool dyes and cellulose aceate dyes.

*Example 11*

An interpolymer of 88% acrylonitrile-12% vinyl chloroacetate by weight was dissolved in dimethylacetamide and 10% of acetic acid, methyl hydrazide was added to it. The solution was stirred at room temperature for ½ hour and then spun into fibers. The fibers dyed well with cellulose acetate dyes, acid wool dyes, and vat dyes.

*Example 12*

An interpolymer having the composition by weight of 80% acrylonitrile-20% methallyl chloride was prepared as an aqueous emulsion and was isolated as a fine powder. One hundred parts of the polymer were stirred 4 hours at 80° with a solution of 30 parts lactic acid hydrazide in 300 parts of isopropyl alcohol. The polymer was then filtered, washed with isopropyl alcohol, and dried. Fibers spun from the treated polymer dyed heavily with acetate dyes, acid wool dyes, direct dyes, and vat dyes.

*Example 13*

An interpolymer was made having the composition by weight of 85% acrylonitrile-5% ethyl acrylate-10% allyl bromide. Fibers were made by wet spinning a solution of the polymer in dimethyl formamide. The fibers were soaked for 3 hours at 90° in a 10% solution of glycolic acid hydrazide. They were then rinsed and dried. They dyed heavily with acid wool dyes, direct cotton dyes, vat dyes, and premetallized dyes.

*Example 14*

An interpolymer having the composition by weight of 82% acrylonitrile and 18% allyl chloride was prepared by tumbling at 50° C. for 24 hours, an emulsion having on a weight basis 82 parts of acrylonitrile, 18 parts of allyl chloride, 400 parts of water, 1.2 parts of lauryl alcohol sulfate, 0.8 part of ammonium persulfate, 0.4 part of sodium bisulfite and 3 parts of acetic acid. The polymeric product which precipitated was filtered from the reaction mixture, washed with water and dried at 60° C. It was then dissolved in dimethyl formamide and wet-spun into fibers. A part of these fibers were heated in a 10% aqueous solution of N,N-dimethyl hydrazine for 3 hours at 95–100° C., followed by washing with water and drying. Analysis of the treated fibers showed a nitrogen content of approximately 28% by weight which corresponds to from 10–15% by weight of hydrazo units.

The treated fibers were divided into three portions and each portion dyed a different color, i.e., one portion was dyed a deep yellow shade by immersion for 1 hour at the boil in an aqueous dye bath containing 3% concentration of Milling Yellow 5G (Colour Index No. 18950), acetic acid and sodium sulfate, the second portion was dyed an even red shade by immersion for 1 hour at the boil i nan aqueous dye bath containing 3% concentration of Milling Red G (Colour Index No. 22245), acetic acid and sodium sulfate and the third portion was dyed an even blue shade by immersion for 1 hour at the boil in an aqueous bath containing 3% concentration of Cibalan Blue BL (Colour Index No. Acid Blue 168) with no additions.

In contrast to the above excellent dye results with the N,N-dimethyl hydrazine treated fibers, attempts to dye the untreated fibers by exactly the same procedure as described above resulted in only very weak tints of yellow, pink and blue. Fibers of untreated 100% polyacrylonitrile did not dye at all with the aforementioned yellow and red dyes, while the aforementioned blue dye gave only light blue tinted polyacrylonitrile fibers. Also, for comparison purposes polyacrylonitrile per se was treated with hydrazine and the fibers produced therefrom were subjected to dyeing as above, but here too only very light tints were obtained on the fibers and, in fact, the tints obtained did not correspond to that expected from the dyes used. In the case of the aforementioned blue tint, the tint obtained was actually light green in color instead of the expected blue tint. Accordingly, this kind of modified polyacrylonitrile material was not suitable for any kind of commercial use.

*Example 15*

The procedure of above Example 14 was repeated, except that the interpolymer consisted of 76% by weight of acrylonitrile and 24% by weight of allyl chloride. The N,N-dimethyl hydrazine treated fibers therefrom were found by analysis to contain a nitrogen content corresponding to about 15–20% by weight of hydrazo units. They dyed to slightly darker shades of yellow, red and blue than the fibers produced according to Example 14. The untreated fibers likewise on dyeing gave only light tints of yellow, pink and blue.

The above examples show the various modified copolymers of the invention to have utility primarily as fiber-forming materials of good dyeability. However, those members treated with hydrazo compounds containing a phenolic nucleus or aromatic amine nucleus are of particular interest because they can be converted into dyes that are chemically attached to the polymer molecule. For example, the initial copolymer may be treated with a substituted hydrazine or hydrazide that contains the

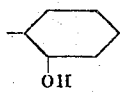

group. Subsequent treatment of this copolymer with a diazo compound results in a coupling reaction with the phenolic group to produce a dye. Similar results are obtained by using a substituted hydrazine or hydrazide that contains the group

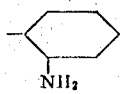

Analogous naphthalene derivatives may be employed. By using suitable compounds, groups having the structure

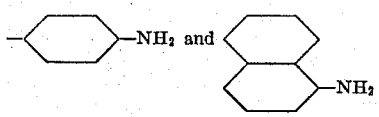

can be introduced into the polymer molecule. These can then be diazotized and coupled with suitable aromatic amines or phenols to give dyes that are chemically attached to the polymer molecule. Such materials are useful for various color photographic processes.

The invention has been described in detail with particular references to preferred embodiments thereof, but it will be understood that variations and modifications can be effected within the spirit and scope of the invention as described hereinabove and as defined in the appended claims.

What we claim is:

1. A polymer of improved dyeability comprising the reaction product of (1) a copolymer of from 3–35% by weight of a compound having the general formula

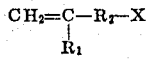

and conversely from 96–65% by weight of at least one different monoethylenically unsaturated, polymerizable compound containing a —CH=C< group, with (2) a hydrazo compound having the general formula

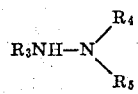

wherein the above formulas $R_1$ is selected from the group consisting of hydrogen and a methyl group, $R_2$ is divalent member selected from the group consisting of an alkylene group, an oxyalkylene group and an alkylenecarboxy group wherein in each instance the said alkylene contains from 1–4 carbon atoms, $R_3$ is selected from the group consisting of hydrogen, an alkyl group of from 1–8 carbon atoms and a cyclohexyl group, $R_4$ is selected from the group consisting of hydrogen, an alkyl group of from 1–8 carbon atoms, a cyclohexyl group and a monohydroxyalkyl group containing from 2–4 carbon atoms, $R_5$ is selected from the group consisting of hydrogen, an alkyl group of from 1–8 atoms, an acyl group of a saturated monobasic fatty acid containing from 2–8 carbon atoms, a benzoyl group, a gycolyl radical, a lactoyl radical and a salicyloyl group and X is selected from the group consisting of chlorine and bromine.

2. An acrylonitrile polymer of improved dyeability comprising the reaction product of (1) a copolymer of from 10–25% by weight of alkyl chloride and conversely from 90–75% by weight of acrylonitrile, with (2) N,N-dimethyl hydrazine.

3. An acrylonitrile polymer of improved dyeability comprising the reaction product of (1) a copolymer of from 10–25% by weight of methallyl chloride, and conversely from 90–75% by weight of acrylonitrile, with (2) acetic hydrazide.

4. An acrylonitrile polymer of improved dyeability comprising the reaction product of (1) a copolymer of from 10–25% by weight of vinyl chloroacetate and conversely from 90–75% by weight of acrylonitrile, with (2) acetic acid, methyl hydrazide.

5. An acrylonitrile polymer of improved dyeability comprising the reaction product of (1) a copolymer of from 10–25% by weight of 2-chloroethyl ether and conversely from 90–75% by weight of acrylonitrile, with (2) phenyl hydrazine.

6. An acrylonitrile polymer of improved dyeability comprising the reaction product of (1) a copolymer of from 10–25% by weight of 4-chloro-butene-1 and conversely from 90–75% by weight of acrylonitrile, with (2) salicylic acid, hydrazide.

7. A process of preparing a polymer of improved dyeability which comprise reacting at from about 20°–100° C., (1) a copolymer of the composition of from 4–35% by weight of a compound having the general formula

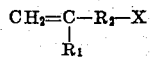

and conversely from 96–65% by weight of at least one different monoethylenically unsaturated polymerizable compound containing a —CH=C< group, with (2) a hydrazo compound having the general formula

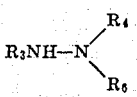

wherein the above formulas $R_1$ is selected from the group consisting of hydrogen and a methyl group, $R_2$ is divalent member selected from the group consisting of an alkylene group, an oxyalkylene group and an alkylenecarboxy group wherein in each instance the said alkylene contains from 1–4 carbon atoms, $R_3$ is selected from the group consisting of hydrogen, an alkyl group of from 1–8 carbon atoms and a cyclohexyl group, $R_4$ is selected from the group consisting of hydrogen, an alkyl group of from 1–8 carbon atoms, a cyclohexyl group and a monohydroxyalkyl group containing from 2–4 carbon atoms, $R_5$ is selected from the group consisting of hydrogen, an alkyl group of from 1–8 carbon atoms, an acyl group of a saturated monobasic fatty acid containing from 2–8 carbon atoms, a benzoyl group, a glycolyl radical, a lactoyl radical and a salicyloyl group and X is selected from the group consisting of chlorine and bromine.

8. A process for preparing an acrylonitrile polymer of improved dyeability which comprises reacting at from about 20–100° C. (1) a copolymer of the composition of from 10–25% by weight of allyl chloride and conversely from 90–75% by weight acrylonitrile, with (2) N,N-dimethyl hydrazine.

9. A process of preparing an acrylonitrile polymer of improved dyeability which comprises reacting at from about 20–100° C. (1) a copolymer of the composition of from 10–25% by weight of methallyl chloride and conversely from 90–75% by weight acrylonitrile, with (2) acetic hydrazide.

10. A process for preparing an acrylonitrile polymer of improved dyeability which comprises reacting at from about 20–100° C. (1) a copolymer of the composition of from 10–25% by weight of vinyl chloroacetate and conversely from 90–75% by weight acrylonitrile, with (2) acetic acid, methyl hydrazide.

11. A process for preparing an acrylonitrile polymer of improved dieability which comprises reacting at from about 20–100° C. (1) a copolymer of the composition of from 19–25% by weight of 2-chloroethyl ether and conversely from 90–75% by weight acrylonitrile, with (2) phenyl hydrazine.

12. A process for preparing an acrylonitrile polymer of improved dyeability which comprises reacting at from about 20–100° C. (1) a copolymer of the composition of from 10–25% by weight of 4-chloro-butene-1 and conversely from 90–75% by weight acrylonitrile, with (2) salicylic acid, hydrazide.

References Cited by the Examiner

UNITED STATES PATENTS

| 2,324,935 | 7/43 | Kautter et al. | 260—89.5 |
| 2,486,241 | 10/49 | Arnold | 260—85.5 |
| 2,497,526 | 2/50 | Arnold | 8—115.5 |

JOSEPH L. SCHOFER, *Primary Examiner.*

PHILIP MANGAN, LEON J. BERCOVITZ, *Examiners.*

UNITED STATES PATENT OFFICE
CERTIFICATE OF CORRECTION

Patent No. 3,194,797                              July 13, 1965

John R. Caldwell et al.

It is hereby certified that error appears in the above numbered patent requiring correction and that the said Letters Patent should read as corrected below.

Column 1, lines 67 to 71, formula (II) should appear as shown below instead of as in the patent:

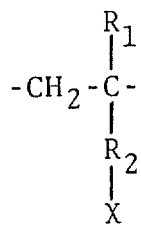

column 3, line 53, for "axo-" read -- azo- --; column 6, line 31, for "i nan" read -- in an --; column 7, line 38, for "3-35%" read -- 4-35% --; line 65, after "1-8" insert -- carbon --; column 8, line 73, for "dieability" read -- dyeability --.

Signed and sealed this 20th day of September 1966.

(SEAL)
Attest:

ERNEST W. SWIDER                          EDWARD J. BRENNER
Attesting Officer                       Commissioner of Patents